United States Patent
Shook

[19]

[11] Patent Number: 6,003,919
[45] Date of Patent: Dec. 21, 1999

[54] EXPANDABLE TRAILER

[75] Inventor: Edwin L. Shook, San Antonio, Tex.

[73] Assignee: Shook Electronics USA, Inc., San Antonio, Tex.

[21] Appl. No.: 08/828,342

[22] Filed: Mar. 28, 1997

[51] Int. Cl.[6] .................................................. B60P 3/35
[52] U.S. Cl. ...................................................... 296/26.14
[58] Field of Search .............................. 296/26.09, 26.1, 296/26.11, 26.13, 26.14, 26.15, 165, 169, 170, 171, 172, 173, 174, 175, 176

[56] References Cited

U.S. PATENT DOCUMENTS

| | | | |
|---|---|---|---|
| Re. 32,262 | 10/1986 | Stewart | 296/171 |
| Re. 32,647 | 4/1988 | Wilson | 296/181 |
| 1,318,994 | 10/1919 | Hancock | 296/169 |
| 1,881,482 | 10/1932 | Gilkison | 296/169 |
| 2,181,844 | 11/1939 | Winters | 296/173 |
| 2,639,187 | 5/1953 | Grumbache | 296/37.6 |
| 2,704,223 | 3/1955 | Houdart | 296/26.13 |
| 2,744,781 | 5/1956 | Black | 296/21 |
| 2,793,067 | 5/1957 | Couse | 296/173 |
| 3,032,217 | 5/1962 | Musson et al. | 254/3 R |
| 3,240,408 | 3/1966 | Lapansie | 224/401 |
| 3,534,997 | 10/1970 | Mitchell, Jr. | 296/176 |
| 3,632,153 | 1/1972 | Knudsen | 296/169 |
| 3,881,746 | 5/1975 | Newcomb, Jr. | 280/763.1 |
| 4,103,958 | 8/1978 | Parent | 296/165 |
| 4,878,800 | 11/1989 | Dell | 414/401 |
| 4,918,772 | 4/1990 | Haile | 5/119 |
| 4,955,661 | 9/1990 | Mattice | 296/171 |
| 4,960,299 | 10/1990 | Steadman | 296/26.15 |
| 4,974,377 | 12/1990 | Dominitz et al. | 52/143 |
| 5,052,878 | 10/1991 | Brockhaus | 414/522 |
| 5,106,142 | 4/1992 | Hegedus | 296/26.02 |
| 5,127,697 | 7/1992 | St. Marie | 296/26.09 |
| 5,248,180 | 9/1993 | Hussaini | 296/171 |
| 5,398,986 | 3/1995 | Koob | 296/24.1 |

Primary Examiner—Andrew C. Pike
Attorney, Agent, or Firm—Akin, Gump, Strauss, Hauer & Feld, L.L.P.

[57] ABSTRACT

An expandable trailer having greatly improved operational simplicity and strength includes an expandable wall connected to slide rails mounted to the trailer chassis, which allows the expandable wall to be easily and efficiently translated between an open position and a closed position. An expandable enclosure is formed adjacent a trailer shell by the expandable wall and a plurality of panels hinged to the trailer shell.

20 Claims, 7 Drawing Sheets

EXPANDABLE TRAILER

FIELD OF THE INVENTION

This invention relates to mobile structures such as trailers. More particularly, it relates to mobile structures which can be expanded from a small storage or transit size to a larger size to provide additional interior work or living space.

BACKGROUND OF THE INVENTION

Mobile enclosures such as trailers are used for almost innumerable purposes. A variety of such enclosures, such as mobile homes, tractor trailer rigs, and camping trailers, have evolved to meet various commercial and recreational needs. In many cases, the size of a trailer may be limited by factors such as, for example, laws and regulations limiting the size of vehicles allowed on the highways, the need for a compact storage volume, the limitations imposed by a garage or other structure in which the trailer is to be stored when not in transit, and a desire to minimize wind resistance during transit. However, trailers sized to accommodate these transit and storage considerations may not allow for the quantum of internal volume desired (or even necessary) for the trailer to perform its intended function, such as providing temporary living or work space when not in transit or storage.

Expandable trailers have evolved to overcome this problem. An expandable trailer is one that is repeatedly reconfigurable from a closed configuration to an open configuration. In the closed configuration, the trailer shell has outer dimensions suitable for transit or storage. In the open configuration, portions of the trailer are reconfigured to provide an expandable enclosure adjacent and connected to the trailer shell. Thus, in the open configuration, the trailer shell and expandable enclosure together provide the desired quantity of internal volume available for work and/or living space.

A common expandable trailer concept might be thought of as the box-within-a-shell concept. Under this concept, the expandable enclosure comprises a box having multiple sides which are permanently connected to each other. In the closed configuration the box is positioned within the shell, which minimizes the trailer's overall dimensions for transit or storage. When additional internal volume is needed, the box is moved out of the shell, usually in a direction lateral to the trailer's length.

One disadvantage associated with this concept is the amount of volume required to store the box within the shell in the closed position. The volume required may be so great, for example, that the trailer shell might not be usable at all when in the closed position. Moreover, this arrangement leads to inflexibility and interference difficulties with respect to the placement of items such as cabling, air conditioning ducts, appliances, and any other type of hardware mounted within the interior space of the shell. Additionally, because multiple panels (ceiling, floor, sides) forming the box are permanently joined together, the deployment mechanism must be able to move the weight of the entire box in and out of the shells. This often requires the use of devices such as rack and pinion mechanisms, which may jam if not in perfect alignment.

Another expandable trailer concept involves the placement of various hinged panels on or in the shell that can be pivoted into their various positions such as the ceiling, floor, side walls, and outermost wall of the expandable enclosure. A common problem with this concept is that the outermost wall of the expandable enclosure cannot be attached directly to the shell, unlike the other panels forming the expandable enclosure.

For example, in U.S. Pat. No. 5,106,142, issued to Hegedus, a panel must first be rotated into its ceiling position of the expandable enclosure, carrying the outermost wall with it as it moves, and only after the ceiling is in position can the outermost wall then pivot down or roll out from the ceiling panel. In addition, the hinged nature of the panel impairs its ability to to form a tight seal with the shell when the trailer is in its closed configuration. Another folding panel approach is shown in U.S. Pat. No. 2,181,844, issued to Winters. Winters does not have an outermost wall per se. Instead two arcuate sections are pivoted outward from inside the shell, and then panels stored within these sections are telescoped from their ends until they meet each other. At this point, the two arcuate sections form one continuous arcuate section that serves the same purpose as the side walls and outermost wall found on a box-like expandable enclosure. A disadvantage of the Winters approach is the amount of shell volume occupied by the two arcuate positions when in the stored or closed position, leading to many of the same difficulties as with the box-within-a-shell concept. A second disadvantage is that, where structural walls are required, separate sets of structural walls are required for the shell and for the expandable section, thus resulting in potential duplication of relatively heavy and large structural wall members.

SUMMARY OF THE INVENTION

From the foregoing, it is apparent that there is a need for an expandable trailer in which the components of the expandable enclosure occupy a minimal volume when in the closed configuration, and which can be easily and efficiently reconfigured into an open configuration forming a sturdy enclosure providing the desired amount of additional interior volume. This invention provides a trailer having an expandable enclosure which meets these needs.

An expandable wall forms the outermost wall of the expandable enclosure and is mounted to a trailer shell via upper and lower slide rails. The rails are connected directly to the trailer shell's chassis, with the upper slide rails being connected to the chassis above the shell ceiling, and the lower slide rails being connected to the portion below the shell floor. The rails are positioned perpendicular to at least one of the shell walls, and maintain the expandable wall in a substantially parallel relationship with the shell wall.

In the closed position, a major portion of the lengths of the slide rails are positioned within the body of the chassis. A motorized linear actuator is used to slide a portion of the rails out of the chassis to a predetermined distance from the shell to position the expandable wall at its open position. By supporting the outermost wall with the slide rails, the need to have such wall hinged to a folding panel is eliminated. Furthermore, the slide rails provide a strong, easily manipulated platform for both moving the expandable wall and supporting the wall when it is in the open position, thereby enhancing the weight-bearing capability of the expandable enclosure. Moreover, since the rails are positioned within the chassis above the ceiling and below the floor of the shell, they do not occupy any of the interior work or living space that might be desirable for use when the trailer is in storage or transit. Further, since the rails only move in reciprocal linear directions, their movement has a minimal, if any, negative effect on the placement and positioning of items such as wiring and air conditioning ducts stored above the ceiling or below the floor. Since the trailer chassis provides structural support, the need for add on supports and braces is eliminated or minimized.

The remaining members of the expandable enclosure—the sidewalls, rotating ceiling, and rotating floor—are hingedly fastened directly to the shell wall. Since none of these members are permanently connected to each other or to the expandable wall, they are easily stored in the closed position parallel or coplanar with each other adjacent the shell wall, thus reducing their combined storage volume to an absolute minimum. In the preferred embodiment, the storage volume is so compact that these panels can be stored within the thickness of the shell wall, if desired, which not only frees up interior space, but also minimizes the exterior dimensions of the shell for storage and transport. Since none of the panels forming the expandable enclosure are connected to each other, the primary support mechanism, i.e., the slide rails, must carry only the weight of the expandable wall when the trailer configuration is changed from the closed configuration to the open configuration and vice versa. This reduction in weight allows for the use of a simple roller system as opposed to more complicated device such as a rack and pinion mechanism.

The set up and take down of the expandable enclosure is made extremely simple by the use of linear action slide rails to position the expandable enclosure's main structural support elements, i.e., the slide rails and expandable wall. Set up and take down is further simplified by the use of a cable and pulley system connected to the pivoting ceiling and pivoting floor which automatically moves these panels between their closed position and the open position. The foregoing and other advantages of this invention will become more apparent from the following detailed description, taken in connection with the accompanying drawings.

BRIEF DESCRIPTION OF THE DRAWINGS

The present invention is more easily understood with reference to the drawings, in which.

DETAILED DESCRIPTION OF THE PREFERRED EMBODIMENT

Figure 1:
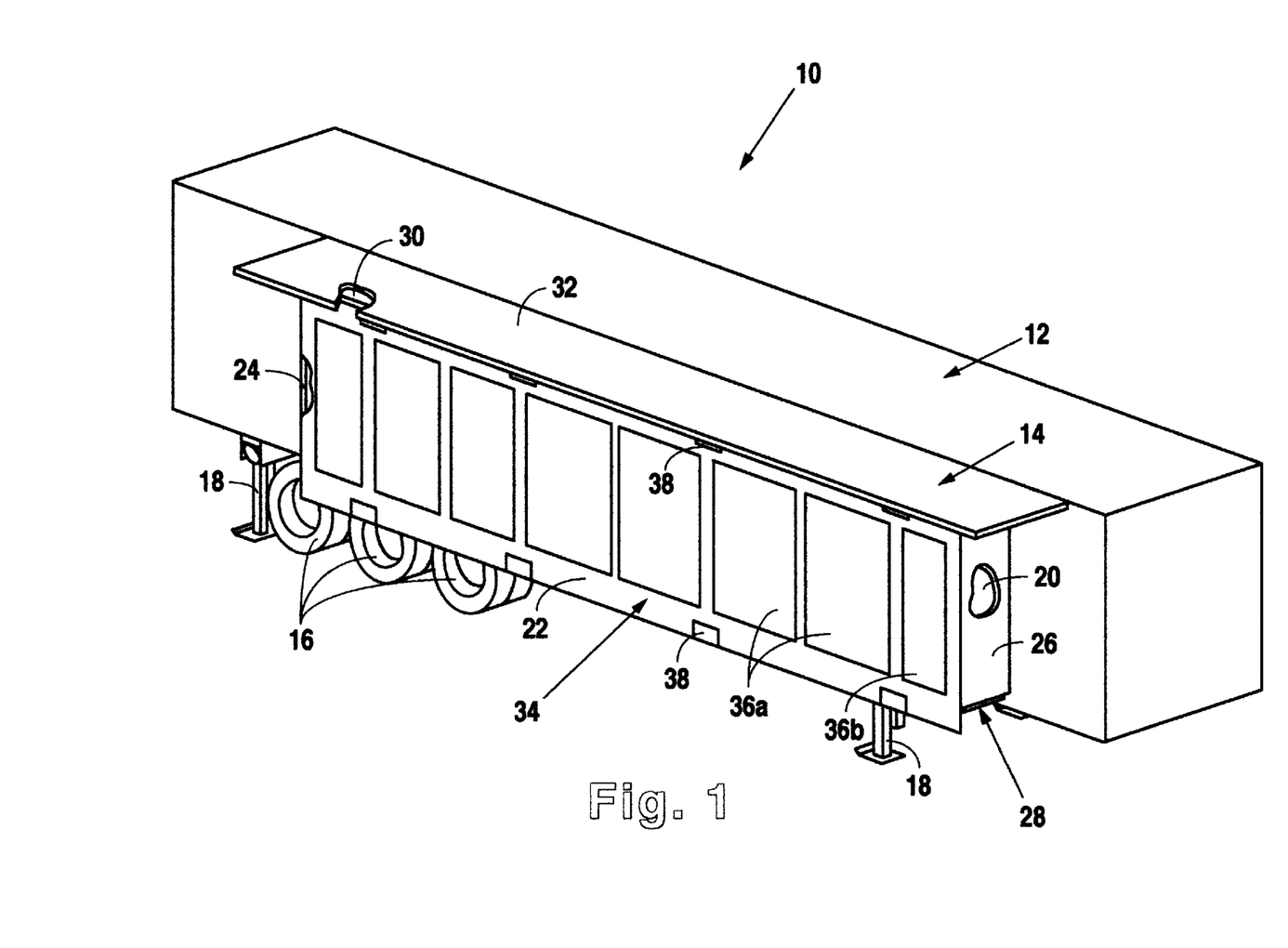
FIG. 1 is a perspective view of the expandable trailer showing the expandable enclosure in an open position.

Referring to FIG. 1, an expandable trailer 10 is shown having a shell 12 and an expandable enclosure 14 in the open position. The expandable trailer is equipped with the desired number of tires or wheels 16 for mobile transport and stabilizers 18 for supporting and leveling the trailer when it is stationary.

The expandable enclosure 14 has an internal volume 20 defined by its external panel members, which more specifically include an expandable wall 22, pivoting side panels 24 and 26, a pivoting floor 28, and a pivoting ceiling 30. Expandable enclosure 14 also includes another panel member, awning 32, which is positioned above pivoting ceiling 30. These panels may be made from a number of readily available materials, such as plywood, composites, sheet metal, or combinations of the foregoing, using a number of methods known to those skilled in the art. The panels can incorporate webs, stiffeners, brackets, fastening devices, or other structural support devices as necessary to support the anticipated loads that will be encountered as a result of the trailer's use for its intended purpose.

Expandable wall 22 includes a frame 34 in combination with a series of various sized lightweight panels, for example, panel sizes 36a and 36b. The panels' primary purpose is to lighten the weight of the expandable wall 22 and thus composites are the preferred material for the panels. The panels can be fashioned from a number of materials including fiberglass, KEVLAR® material, and graphite, which can be assembled into solid laminates, for example, sandwich structures made from sheets of such materials disposed on opposite sides of a lightweight honeycomb, and or other types of composite assemblies known to those skilled in the art. The composite panels 36a and 36b can be attached to frame 34 permanently or semipermanently, as desired. Removable access panels 38 are spaced at desired intervals within frame 34 to permit inspection, withdrawal, and servicing of the slide rails without deploying the expandable portion of the trailer.

Figure 2:
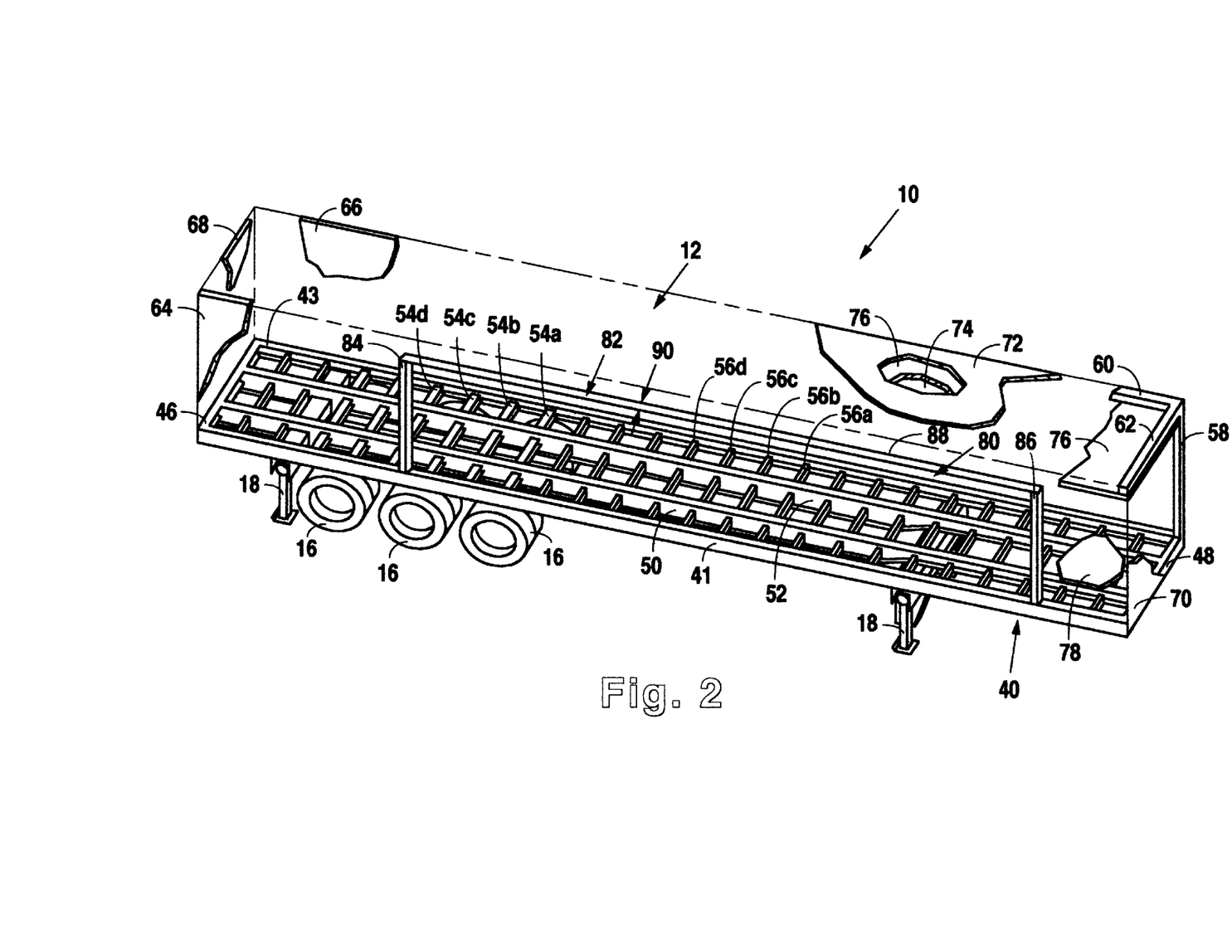
FIG. 2 is a perspective, cutaway view of the trailer chassis and trailer shell.

In FIG. 2, the expandable enclosure 14 is removed to show the shell chassis 40, which is the structural support for the trailer 10. The external portions of the chassis 40 can comprise 10-inch steel C channels, and include a pair of such channels 41 and 43 extending in the trailer's longitudinal direction, and a pair of such channels 46 and 48, extending in the trailer's transverse direction. Additional strength and stiffness can be provided in the longitudinal direction by 16-inch steel I-beams 50 and 52. Additional stiffness and strength in the transverse direction is provided by a number of five-inch steel I-beams, for example 54a–54d, and 5-inch C channels, for example 56a–56d, generally spaced about 24 inches apart. The spacing of the transverse beams and channels, as well as the use of a beam or channel at a given location, may vary as necessary to accommodate most considerations and anticipated loading conditions.

The chassis 40 is fabricated using techniques well known to those skilled in the art, and will include additional support elements extending up from the portion of the chassis 40 shown, as well as additional transverse and longitudinally oriented support members. To preserve the clarity of the drawing, only one vertically oriented member 58, longitudinal member 60, and transverse member 62 are shown. One skilled in the art will recognize that the placement and type of additional support elements will be dependent on the intended use of the trailer and its desired characteristics.

The external dimensions of the shell 12 are generally defined by first and second walls 64 and 66 extending in the longitudinal direction, a pair of end walls 68 and 70 extending in the transverse direction, and the shell roof 72. The shell's internal living or work volume 74 is defined at the top by internal ceiling 76, at the bottom by the shell floor 78, and on the sides by shell walls 64, 66, 68, and 70.

An opening 80 is provided in first wall 64 as shown and connects the living or work volume 74 in shell 12 with the volume 20 in the expanded portion (see FIG. 1). The opening 80 is defined by frame 82, which includes vertical support posts 84 and 86 and spanning member 88. Each of the frame members 82, 84, and 86 has a thickness 91 in the transverse direction of the trailer 10.

Figure 3:
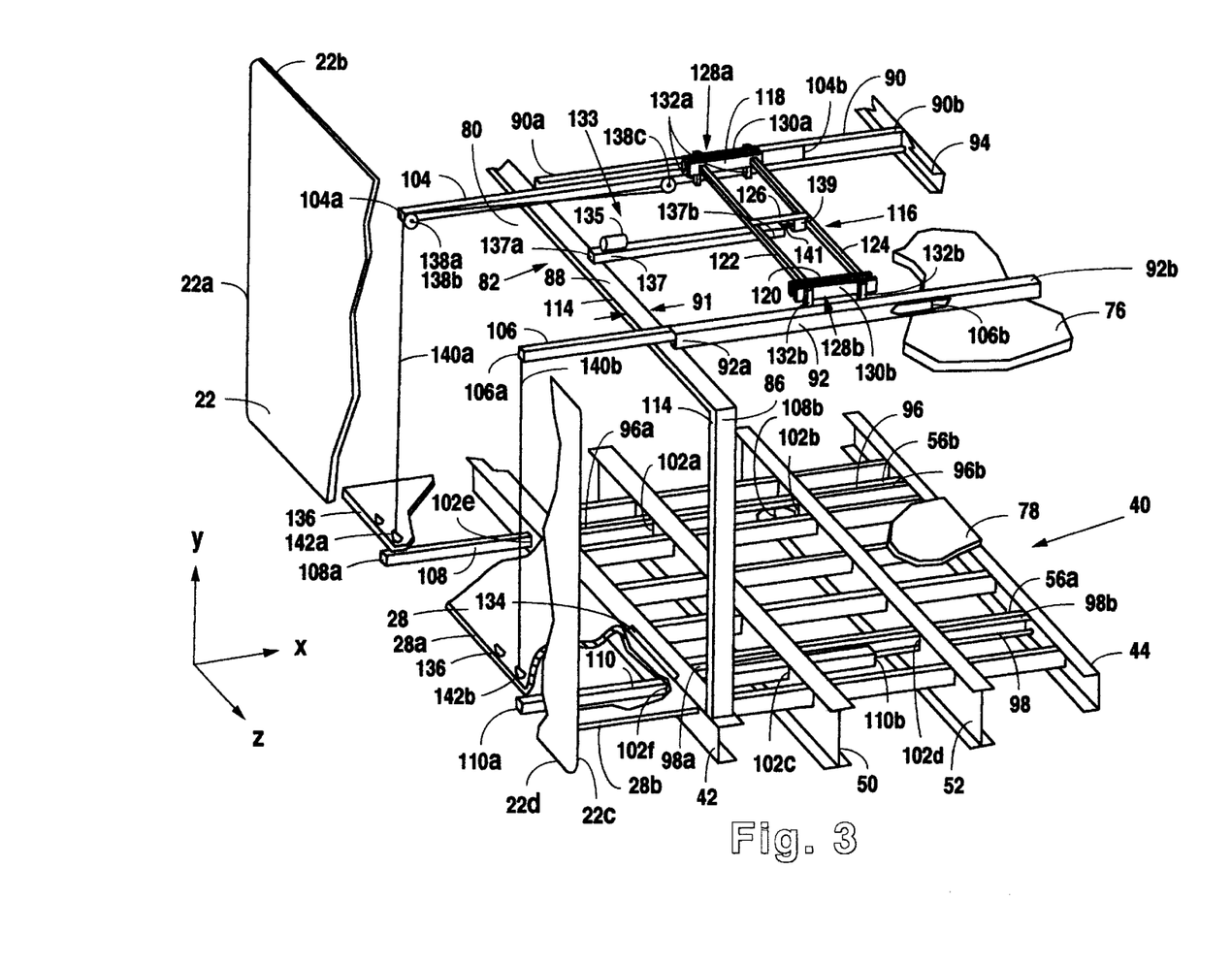
FIG. 3 is a perspective view showing the general relationship between portions of the trailer shell and portions of the expandable enclosure.

FIG. 3 shows an example interconnection between the expandable wall 22 and the chassis 40. The awning 32 and the external portions of the shell 12 (shown in FIGS. 1 and 2) are removed in their entirety for clarity. Similarly, portions of the expandable wall 22, pivoting floor 28, internal ceiling 76, and the shell floor 78 are removed for clarity.

A pair of upper tracks 90 and 92 are supported at ends 90a and 92a by the spanning member 88 on frame 82. Ends 90b and 92b are supported by beam or channel 94 which is part of the chassis 40. Both of the tracks 90 and 92 are positioned above internal ceiling 76.

A pair of lower tracks 96 and 98 are installed in the chassis 40 beneath shell floor 78. Lower tracks 96 and 98 are constructed to have a vertical height suitable for placing the tracks within the 5-inch C channels 56a and 56d and fastening thereto. Ends 96a and 98a are connected to longitudinal element 42, and ends 96b and 98b are connected to longitudinal element 44. Longitudinal elements 42 and 44 are part of the external portion of chassis 40 and comprise 10-inch steel C channels. The lower tracks 96 and 98 extend through internal beams 50 and 52 through holes 102a–102d. An additional pair of holes 102e and 102f are positioned in longitudinal element 42 adjacent ends 96a and 98a of lower tracks 96 and 98. Each of the upper and lower tracks 90, 92, 96, and 98, are mounted in the chassis 40 generally parallel with each other and generally perpendicularly to the opening 80.

Each upper and lower track has a corresponding slide rail, shown as upper slide rails 104 and 106, and lower slide rails 108, and 110. Each guide rail is connected to a track (as subsequently explained in more detail) such that the slide rails 104, 106, 108, and 110 can translate in reciprocal directions along an X axis through holes 102a–102f, but are restrained from moving in either the Y or Z axis directions. Each slide rail is also restrained from rotating about its own respective longitudinal axis.

The slide rails 104, 106, 108, and 110, are connected to expandable wall 22 at ends 104a, 106a, 108a, and 110a. The lengths of the slide rails are set so that when the expandable wall 22 is in the closed position, ends 104b, 106b, 108b, and 110b do not interfere with longitudinal elements 94 and 44. In the closed position, expandable wall 22 is adjacent frame surfaces 114. In this context, adjacent preferably means in contact with the frame surfaces 114; however, if desired, expandable wall 22 can be positioned within the opening 80. Expandable wall edges 22a–22d can be shaped and sized as desired to provide either of these closed orientations for expandable wall 22.

A carriage 116 connects the upper slide rails 104 and 106 to each other. The carriage 116 includes plates 118 and 120 which are connected to each other by beams 122 and 124. Additional reinforcement pieces such as stiffener 126 can be provided if desired. Such stiffeners may be positioned as shown, and may also extend in diagonal directions to provide strength and stiffness against offset loading conditions.

The carriage 116 is connected to slide bar mounting frames 128a and 128b. The mounting frames 128a and 128b include plates 130a and 130b, respectively, which are attached to slide rails 104 and 106, respectively, by posts 132a and 132b, respectively. The connections between the carriage 116 and the slide bar mounting frames 128a and 128b are made by means of an adjustable attachment (not shown), such as a threaded rod with nuts, that allows the position of the carriage 116 to be adjusted along the Y axis relative to the slide bar mounting frames 128a and 128b.

Linear actuator assembly 133 includes a motor 135, gear box 137, bushing 139, and worm drive 141. The linear actuator 133 and its component parts can comprise a number of devices well known to those skilled in the art, including a varieity of pneumatic or hydraulic actuator systems. In the actuatory assembly of the preferred embodiment, end 137a of gear box 137 is mounted to the spanning member 88 on frame 82, and the gear box 137 extends generally perpendicularly from the spanning member 88 towards carriage 116. Worm or screw drive 141 extends from end 137b of gear box 137 and is connected to bushing 139 mounted to the carriage 116 on beam 124. The bushing can be any device that allows the worm drive 141 to rotate about its longitudinal axis while remaining connected to the worm drive 141 as it moves either in or out of gear box 137. One actuator suitable for the present invention may be selected from the Electrak 2000 series of actuators available from Warner Electric, Inc.

Pivoting floor 28 is shown in the open position, and is connected to the shell adjacent longitudinal element 42 by floor hinge 134. The length of the floor edge 28a and position of hinge 134 are set to permit pivoting floor 28 to lie within the thickness 91 of opening 80, when the pivoting floor 28 is in a closed position. Floor edge 28b and the opposite edge (not shown) of pivoting floor 28 are set to be approximately one half of the height of opening 80. To prevent the pivoting floor 28 from chafing against expandable wall 22 when moving between the open and closed positions, rollers 136 are positioned adjacent edge 28a of the pivoting floor 28.

Also shown in FIG. 3 are ceiling pulley 138a, floor pulley 138b, return pulley 138c, cable 140a, and adjustable cable connection 142a. As subsequently explained in greater detail, the pulleys and cables are used to automatically rotate the pivoting floor 28 (and the pivoting ceiling) between the open and closed positions, depending upon the direction of travel of slide rail 104. Cable 140b and cable connection 142b are part of an analogous pulley system mounted to slide rail 106.

Figures 4, 5:
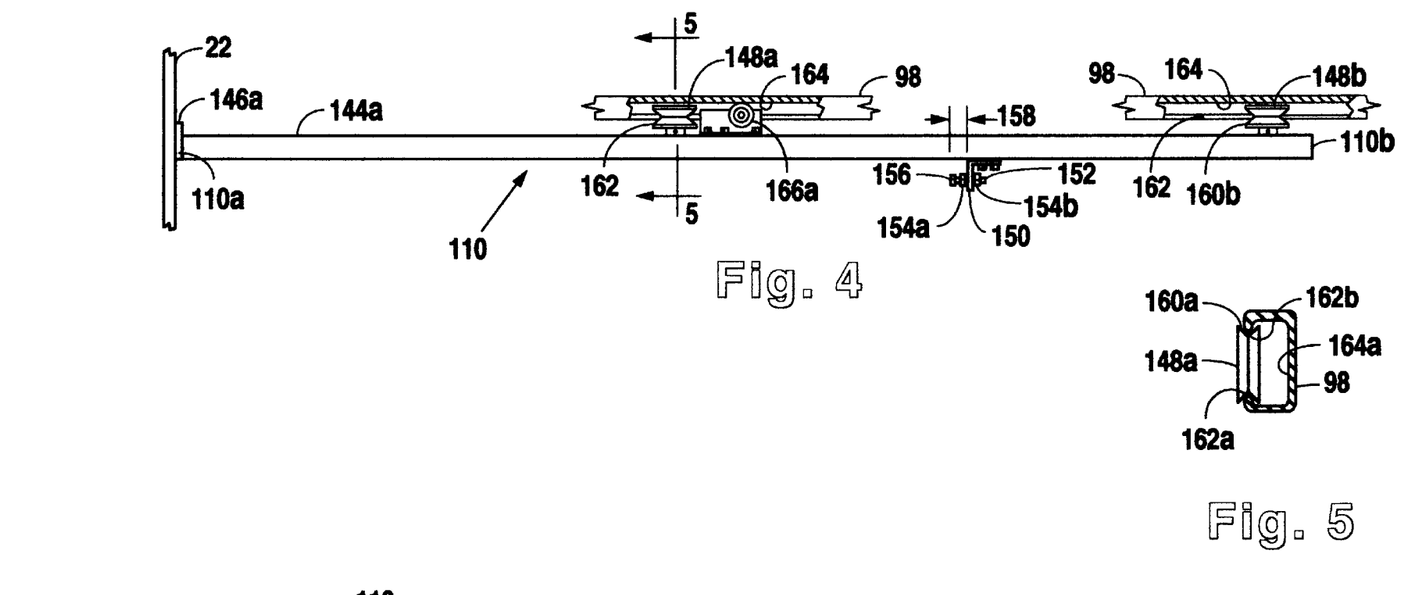
FIG. 4 is a top view of a lower slide rail mounted to a lower track.
FIG. 5 is a sectional view taken along section 5—5 of FIG. 4 showing the relationship between the slide rail rollers and accompanying track.
Figure 6:
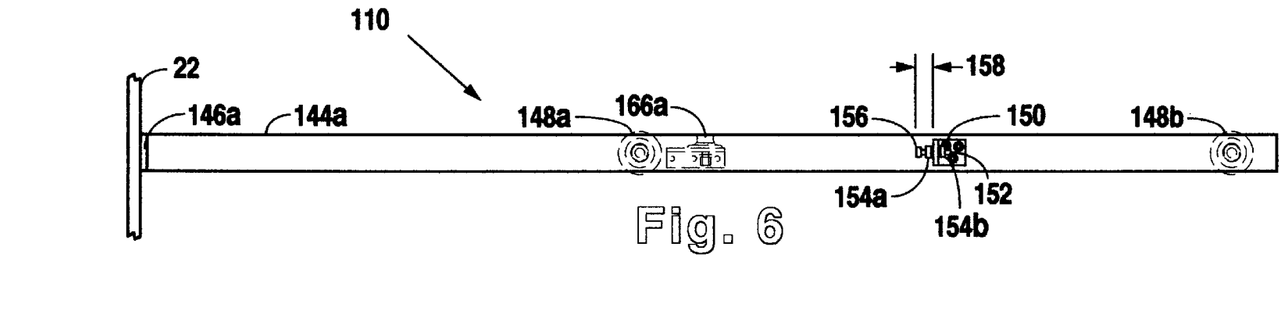
FIG. 6 is a side view of the lower slide rail shown in FIG. 4

The construction of lower slide rail 110 is shown in greater detail in FIGS. 4 and 6. The slide rail 110 includes a tube 144a which is connected to expandable wall 22 at end plate 146a. The tube 144a can be a three-by two-inch steel tube having a one-quarter-inch wall thickness, and the end plate 146a can be a one-quarter-inch thick three-by two-inch steel plate. The position of the roller 148a on the length of the tube will be determined by the amount of travel necessary to move the expandable wall 22 into the open position, at which point roller 148a will still be in contact with lower track 98, and will preferably be as close to opening 80 as possible. Roller 148b is preferably positioned as close to end 110b as possible.

Stop angle 150 is positioned as shown on tube 144a approximately midway between rollers 144a and 144b. The stop angle 150 includes a bolt 152 and a pair of jam nuts 154a and 154b which allow the head 156 of the bolt to be adjustably set a desired distance 158 from stop angle 150.

FIG. 5 is taken along section lines 5—5 in FIG. 4 and shows that roller 148a includes a concave V-shaped bearing surface 160a corresponding to the convex surfaces 162a and 162b on the track 98. Roller 148b has a similar concave surface 160b and is similarly mounted to convex surface 162a. When the expandable portion of the trailer is deployed, forward roller 148a carries a load so as to press downward on lower track 98, while aft roller 148b exerts an upward force on lower track 98. To prevent the rollers 148a and 148b from chafing against face 164 on track 98, antitorque roller 166a is positioned as shown on the tube 144a.

The components and construction of lower slide rail 108, and the connection between lower slide rail 108 and lower track 96 (see FIG. 3), is similar to that shown for lower slide rail 110 and lower track 98 in FIGS. 4, 6, and 5.

Figure 8:
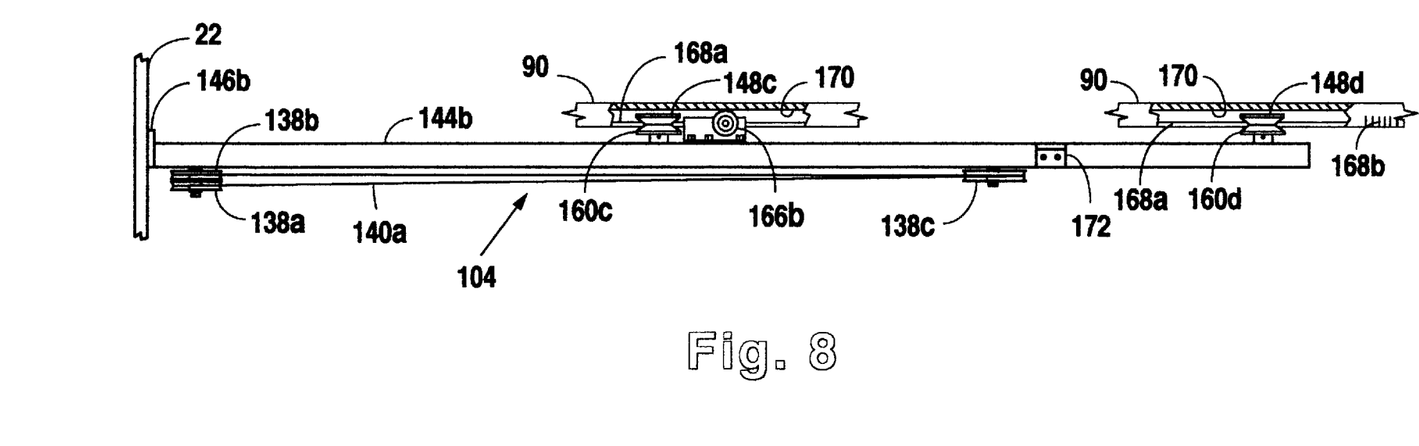
FIG. 8 is a top view of an upper slide rail mounted to an upper track.
Figure 9:
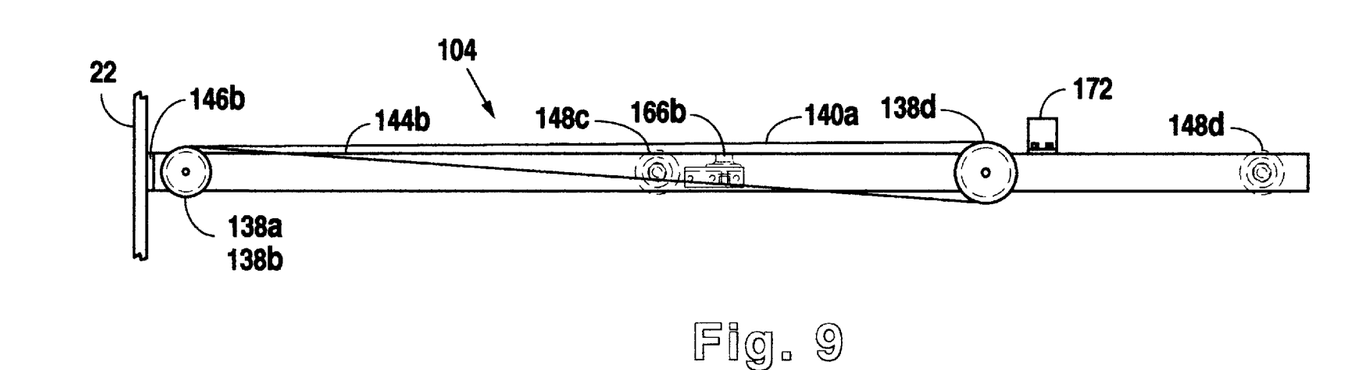
FIG. 9 is a side view of the slide rail shown in FIG. 8.

FIGS. 2, 8 and 9 show that the construction of upper slide rail 104 is similar to that of the lower slide rails 108 and 110. Upper slide rail 104 can be a three-by two-inch steel tube 144b with a quarter-inch wall thickness, which is connected to expandable wall 22 at end plate 146b. The slide rail 104 includes a pair of rollers 148c and 148d which are positioned on the length tube 144b. The rollers have V-shaped bearing surfaces 160c and 160d, respectively, which match corresponding convex surfaces 168a and 168b on upper track 90. Antitorque roller 166b prevents the rollers 148c and 148d from chafing against surface 170 on upper track 90. Stop angle 172 is a 90-degree bracket positioned as shown and bolted to tube 144b. The stop angle 172 is positioned to contact a support member of chassis 40 (shown only in FIG. 2) during extension from the chassis when moving to the open position to stop travel of the slide rail 104 when expandable wall 22 reaches the desired open position.

Ceiling pulley 138a, floor pulley 138b, and return pulley 138c are positioned on the side of the tube 144b opposite from rollers 148c and 148d and antitorque roller 166b. This permits cable 140a to operate between the pulleys without chafing against the other component parts attached to the tube 144b.

The construction of upper slide rail 106, and its connection to upper track 92, is similar to that of slide rail 104 and upper track 90 shown in FIGS. 8 and 3.

Figure 7:
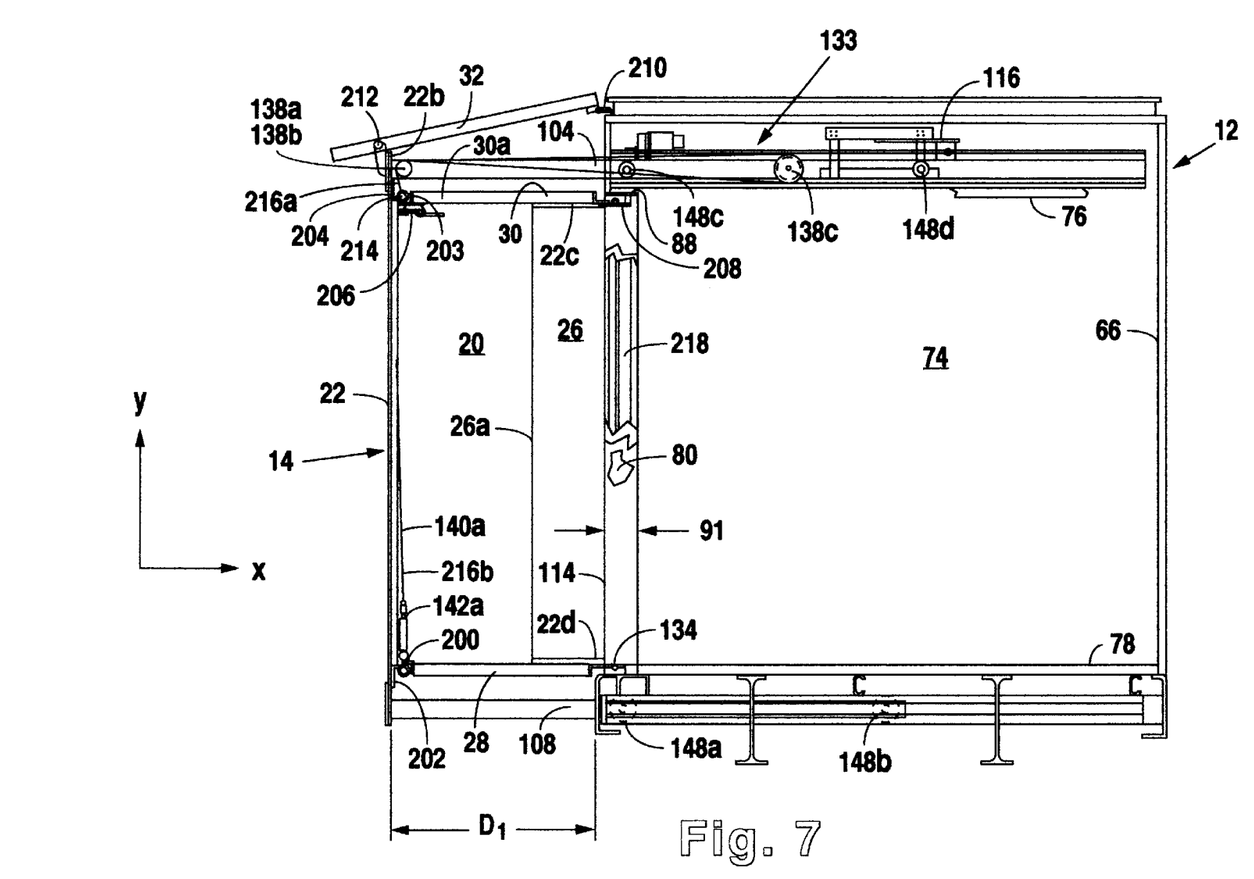
FIG. 7 is a side view of the expandable enclosure in the open configuration.

FIG. 7 is a side view showing the relative positions of the expandable wall 22, awning 32, folding ceiling 30, and folding floor 28, when such items are in the open or expanded position. Expandable wall 22 is positioned a distance D1 from frame surface 114, and is set such that when pivoting floor 28 is in the open position, floor bracket 200 will lie flush with the lower bracket 202 on expandable wall 22 and position floor 28 perpendicular to the expandable wall 22 and frame surface 114. The brackets can be secured together using a number of conventional, off-the-shelf fastening devices well known to those skilled in the art. Similarly, edge 30a on pivoting ceiling 30 has a length that allows ceiling bracket 203 to lie flush with upper bracket 204 on expandable wall 22 to position ceiling 30 perpendicular to the expandable wall 22 and frame surface 114. The brackets 203 and 204 are secured together using one or more ceiling locks 206, which can be a number of conventional, off-the-shelf parts well known to those skilled the art. Hinge 208 connects folding ceiling 30 to spanning member 88, permitting the folding ceiling to rotate from the open position to a closed position (shown in FIG. 10).

The dimensions of folding ceiling 30 permit the ceiling to lie within opening 80 when in the closed position.

Awning hinge 210 connects awning 32 to an upper portion of the shell 12, and permits it to rotate from the open position (shown) to the closed position (not shown). In the closed position, the awning 32 will depend vertically from the hinge 210 and lie flush against expandable wall 22. To prevent expandable wall 22 from chafing the awning 32 during opening and closing of expandable enclosure 14, one or more awning rollers 212 are positioned as shown near the upper edge 22b of expandable wall 22.

Cable 140a has end 216a connected to pivoting ceiling 30 as shown at adjustable connection 214, and end 216b connected to pivoting floor 28 at adjustable connection 142a. The cable is operably connected to slide rail 104 at the ceiling and floor pulleys 138a and 138b, as well as the return pulley 138c. Cable 140b is similarly connected to rotating floor 28, rotating ceiling 30, and slide rail 106.

Side panel 26 is shown in a partially open position. Side panel hinge 218 permits the side panel 26 to rotate between the closed position in which it is positioned within the opening 80, parallel to frame surface 114, and the open position, in which it extends perpendicularly from the opening 80 with edge 26a positioned adjacent expandable wall 22. Edge 26a, and upper and lower edges 26c and 26d can be connected to the expandable wall 22, pivoting floor 28, and pivoting ceiling 30 in a number of conventional ways known to those skilled in the art. The construction of side panel 24 (see FIG. 1) and its connection to shell 12 is similar to that of side panel 26. If desired, the side panels 24 and 26 can include a door (not shown) for entering and exiting to the expandable enclosure 14 without having to first enter the shell 12.

Having described the construction of the invention, its operation will now be described. In the open position shown in FIG. 7, the expandable enclosure 14 can be used, for example, as a walkway or for equipment mounting and storage. Entry and exit from the expandable enclosure 14 can be through opening 80, which connects the expandable enclosure's 14 internal volume 20 with the work or living volume 74 in shell 12. Entry and exit can also be through doors (not shown) positioned in side panels 24 and 26. Portable stairways (not shown) can be moved into position near the side panels 24 and 26 to facilitate entry and exit through these points.

The pivoting floor 30 supports the loads generated by, for example, foot traffic and/or equipment mounted on the pivoting floor 30, by transmitting such loads into the shell chassis 40 at floor hinge 134 and into expandable wall 22 at lower bracket 202. The loads exerted on expandable wall 22 are transmitted back into chassis 40 via the slide rails 104 and 108 (shown) and 106 and 110 (not shown). Efficient loading distribution between the slide units and chassis in the open position is achieved by placing roller 142c as near as possible to frame face 114, and by positioning roller 142d as far from the frame face 144 as possible. The rollers on the other slide rails are similarly positioned.

Expandable wall 22, pivoting floor 28, pivoting ceiling 30, and side panels 24 and 26 can be sealed at their joints and made watertight using conventional means. Awning 32 provides additional weather protection.

The first time the expandable enclosure 14 is moved into the open position, cable adjustments 142a and 214 are used to adjust length of cable 140a to permit floor 28 and ceiling 30 to be positioned snugly in place. Similar adjustments are made to cable 140b (FIG. 3). Any discrepancies in the stopping points established by stop angle 150 (FIGS. 4 and 6) and stop angle 172 (FIGS. 8 and 9) can be corrected by adjustment of bolt 152 to reposition its head 156 relative to stop angle 150.

To reconfigure the expandable enclosure 14 from the open position shown into the closed position, all of the fastening devices connecting the panels together, such as ceiling lock 206, are disconnected to allow the expandable wall 22, side panels 24 and 26, pivoting floor 28, and pivoting ceiling 30, and awning 32 to move relative to each other.

Side panels 24 and 26 are rotated into the closed position first, where they lie parallel with frame face 114, within the thickness 91 of opening 80. The next step is to activate linear actuator 133 to move carriage 116 and the upper slide rails 104 and 106 toward shell wall 66. This begins moving expandable wall 22 towards the frame face 114 as well as moving lower slide rails 108 and 110 in the same direction. While moving, the expandable wall 22 translates along the X axis, while being held parallel to the frame face 114.

Moving the upper slide rails continuously repositions pulleys 138a–138c, allowing end 216a of cable 140a to descend and end 216b to ascend, which simultaneously lowers pivoting ceiling 30 and raises pivoting floor 28.

As the expandable wall moves, the position of chafing roller 212 also moves, allowing the awning 35 to rotate downward. Chafing roller 212, as well as chafing rollers 136 on pivoting floor 30, eliminate the friction that would otherwise occur between the moving parts. Similar rollers may be positioned on ceiling 30 to minimize chafing between ceiling 30 and expandable wall 22.

Figure 10:
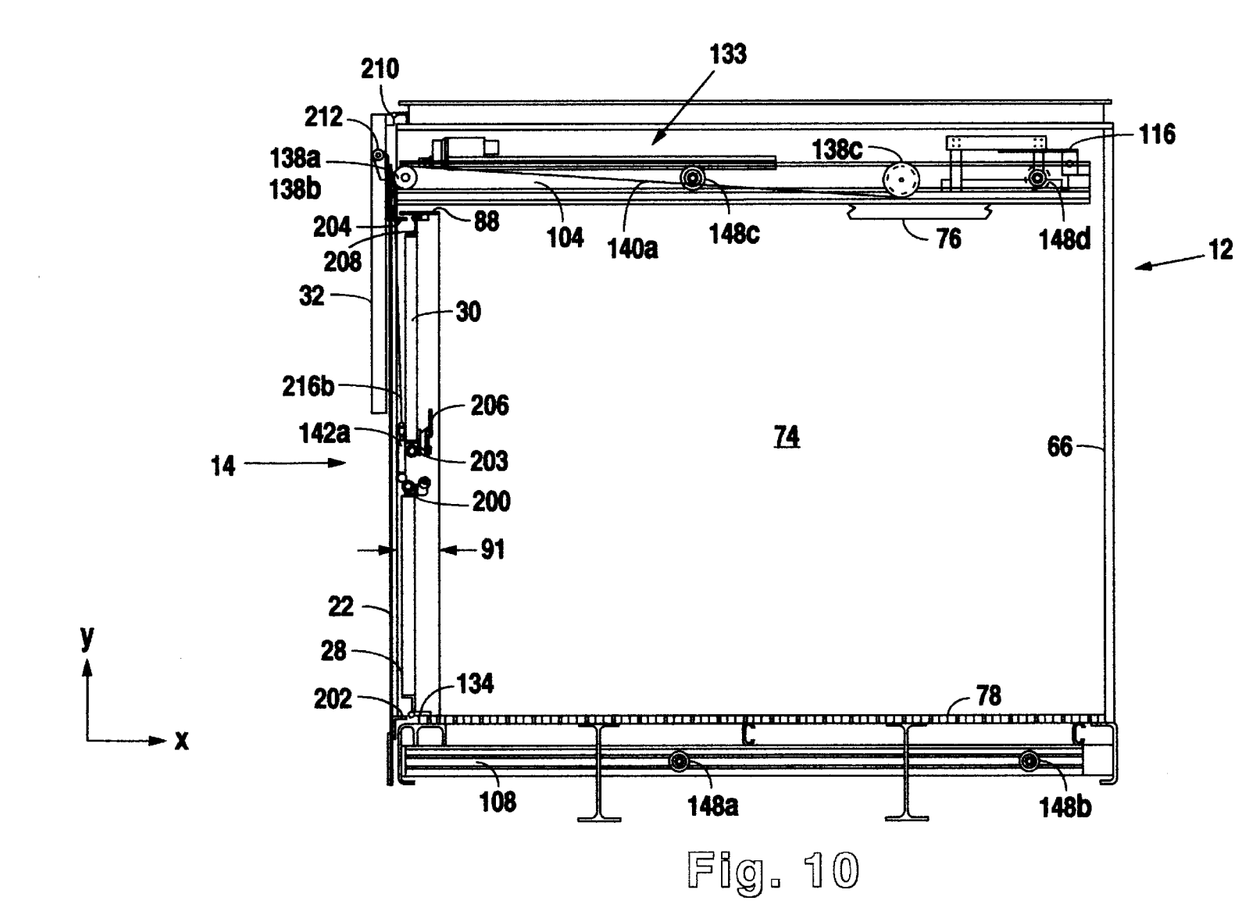
FIG. 10 is a side view of the expandable enclosure in the closed configuration.

In the closed position, pivoting floor 28 and pivoting ceiling 30 will lie substantially parallel with frame face 114 within thickness 91 of opening 80. Expandable wall 22 can lie flush with frame face 114 or be positioned parallel with frame face 114 within thickness 91 of opening 80. Generally, the thickness 91 and the area of opening 80 will be of sufficient sizes to accommodate at least the pivoting ceiling 30, pivoting floor 28, and side panels 24 and 26, simultaneously when such parts are in the closed position. If desired, these dimensions can also be large enough to accommodate expandable wall 22. In the closed position, the awning depends downward from hinge 210 and lies parallel with frame face 114, covering portions of expandable wall 22.

While the above description contains many specificities, these should not be construed as limitations on the scope of the invention, but rather as an exemplification of one embodiment thereof. By way of example, the number of slide rails connected to the expandable wall can vary, the number of linear actuators used can vary, and the number of slide rails connected to a carriage that is operated by a linear actuator can vary. Accordingly, the scope of the invention should be determined not by the embodiment illustrated, but by the appended claims and their legal equivalents.

What is claimed is:

1. An expandable trailer having a shell, the shell having a work volume and a first wall with a thickness, and the trailer also having an expanadable enclosure comprising:
    (a) at least one expandable wall connected to the shell and fixed in a substantially parallel relationship with the first wall, said expandable wall being translatable along an axis substantially perpendicular to the first wall, said expandable wall further being translatable in reciprocal directions along the axis between a closed position adjacent the first wall and an open position a predetermined distance from the first wall; and
    (b) a plurality of panels, each panel having a hinge edge pivotally mounted to the shell, each panel being moveable between a closed position wherein each said panel is substantially parallel with the first wall, and an open position wherein each said panel has a far edge adjacent said expandable wall when said expandable wall is in the open position thereof, and wherein at least one of said panels is substantially perpendicular to the first wall when said one panel is in the open position thereof.

2. The expandable trailer of claim 1, further having at least one slide rail with an end connected to said expandable wall, and an opposite end positioned within the trailer shell, for translating said expandable wall between the open and closed positions thereof.

3. The expandable trailer of claim 2, wherein the shell further includes chassis members positioned above and below the work volume, and each slide rail is slideably engaged with at least one of the chassis members.

4. The expandable trailer of claim 3, further comprising an actuator connected to the shell and operably connected to said slide rail for translating said expandable wall in the reciprocal directions along the axis between the open and closed positions thereof.

5. The expandable trailer of claim 4, wherein each said slide rail includes at least one roller mounting said slide rail to one of the chassis members.

6. The expandable trailer of claim 5, wherein said roller has a concave bearing surface matching at least one complementary convex surface on said one chassis member.

7. The expandable trailer of claim 2, wherein at least one of said panels, when in the closed position thereof, is positioned within the thickness of the first wall.

8. The expandable trailer of claim 7, wherein at least one said slide rail includes a pulley means for moving at least one of said panels into the closed position thereof as the expandable wall is moved into the closed position thereof, and into the open position thereof as the expandable wall is moved into the open position thereof.

9. The expandable trailer of claim 8, wherein at least one of said panels includes a chafing roller positioned near the far edge thereof for contacting said expandable wall when said at least one panel including said chafing roller and said expandable wall move relative to each other.

10. The expandable trailer of claim 9, further including an awning pivotally connected to the shell for covering at least a portion of the expandable closure when the expandable enclosure is in the open position thereof.

11. An expandable trailer comprising:
    (a) a shell having a wall, a working volume, and chassis members positioned above and below the working volume;
    (b) at least one slide rail slideably supported by at least one said chassis member for reciprocal movement along said slide rail's longitudinal axis;
    (c) at least one expandable wall connected to said at least one slide rail, and moveable with said slide rail between a closed position adjacent the shell wall and an open position a predetermined distance from the shell wall; and
    (d) a plurality of panels, each said panel having a first edge connected to the shell, each said panel being moveable between a closed position wherein each said panel is substantially parallel with the shell wall, and an open position wherein each said panel has a second edge positioned adjacent said expandable wall when said expandable wall is in the open position thereof, and wherein at least one of said panels is substantially perpendicular to the shell wall when said one panel is in the open position thereof.

12. The expandable trailer of claim 11, wherein at least one of said panels is positioned within a thickness of the shell wall when said plurality of panels are in the closed position thereof.

13. The expandable trailer of claim 12, wherein each said slide rail includes at least one roller mounting said slide rail to said at least one chassis member.

14. The expandable trailer of claim 13, wherein at least one said roller includes a concave bearing surface matching at least one complementary convex bearing surface on said one chassis member.

15. The expandable trailer of claim 13, wherein at least one said panel has at least one chafing roller positioned on an edge thereof near said expandable wall when in the open position thereof, for bearing against said expandable wall and minimizing chafing between said expandable wall and said at least one panel having said at least one chafing roller when said expandable wall is moving between the closed and open positions thereof.

16. The expandable trailer of claim 15, further comprising an awning connected to the shell wherein one of said plurality of panels is a ceiling panel, and said awning is positioned above at least a portion of said ceiling panel when both said ceiling panel and said awning are in an open position.

17. The expandable trailer of claim 12, further including at least one actuator mounted to the shell and operably connected to said at least one slide rail for moving said slide rail along said slide rail's longitudinal axis.

18. The expandable trailer of claim 17, wherein at least one said slide rail includes a pulley means for moving at least one of said panels between the open and closed positions thereof simultaneously with a movement of said expandable wall between the open and closed positions thereof.

19. An expandable trailer having a shell, the shell having a work volume, a first wall with a thickness, and chassis members positioned above and below the work volume, the trailer also having an expandable enclosure comprising:

(a) at least one expandable wall fixed in a substantially parallel relationship with the first wall, said expandable wall being translatable in reciprocal directions along a slide rail longitudinal axis between a closed position adjacent the first wall and an open position a predetermined distance from the first wall;

(b) at least one slide rail for moving said expandable wall between the open and closed positions, said slide rail having one end connected to said expandable wall, and an opposite end positioned within the trailer shell, said slide rail being slideably connected to at least one said chassis member for reciprocal movement along said slide rail's longitudinal axis;

(c) a plurality of panels, each panel having a hinge edge pivotally mounted to the shell, each panel being moveable between a closed position wherein said panels are positioned within the thickness of the shell wall, and an open position wherein each said panel has a far edge adjacent said expandable wall when said expandable wall is in the open position thereof, and wherein at least one of said panels is substantially perpendicular to the first wall when said at least one panel is in the open position thereof; and (d) a pulley means connected to said at least one slide rail for moving at least one of said panels into the closed position thereof as the expandable wall is moved into the closed position thereof, and into the open position thereof as the expandable wall is moved into the open position thereof.

20. The expandable trailer of claim 19, further comprising:

(a) an actuator mounted to the shell and operably connected to at least one said slide rail for translating said expandable wall along the slide rail's longitudinal axis;

(b) at least one roller connecting each said slide rail to at least one said chassis member, said roller having a concave bearing surface matching at least one complementary convex surface on said chassis member connected to said slide rail;

(c) a chafing roller positioned near the far edge of at least one of said plurality of panels, for contacting and rolling against said expandable wall when said at least one panel having said chafing roller positioned near thereto and said expandable wall move relative to each other; and (d) an awning pivotally connected to the shell for covering at least a portion of the expandable enclosure when the expandable enclosure is in the open position thereof.

* * * * *